United States Patent
Mukherjee et al.

(10) Patent No.: US 12,306,923 B2
(45) Date of Patent: May 20, 2025

(54) SECURELY SHARING DATA ACROSS ISOLATED APPLICATION SUITES

(71) Applicant: Schlumberger Technology Corporation, Sugar Land, TX (US)

(72) Inventors: Ankur Mukherjee, Pune (IN); Vijay Kumar, Pune (IN); Rudi Olufsen, Lysaker (NO); Endri Hysenaj, Lysaker (NO); Haakon Zahl, Lysaker (NO); Truls Arnegaard, Lysaker (NO); Jagdish Idhate, Pune (IN); Morten Brun, Lysaker (NO); Alessandro Bottoni, Montpellier (FR); Helge Johan Fjellanger Fosse, Lysaker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 89 days.

(21) Appl. No.: 18/258,289

(22) PCT Filed: Dec. 22, 2021

(86) PCT No.: PCT/US2021/064780
§ 371 (c)(1),
(2) Date: Jun. 19, 2023

(87) PCT Pub. No.: WO2022/140502
PCT Pub. Date: Jun. 30, 2022

(65) Prior Publication Data
US 2024/0061925 A1    Feb. 22, 2024

(30) Foreign Application Priority Data
Dec. 23, 2020   (IN) .............................. 202031056153

(51) Int. Cl.
*G06F 21/00* (2013.01)
*G06F 21/40* (2013.01)
*G06F 21/62* (2013.01)

(52) U.S. Cl.
CPC ............ *G06F 21/40* (2013.01); *G06F 21/629* (2013.01)

(58) Field of Classification Search
CPC ...... G06F 21/40; G06F 21/629; G06F 16/178; G06F 21/604; G06F 21/606; H04L 63/20; H04L 67/1095
See application file for complete search history.

(56) References Cited

U.S. PATENT DOCUMENTS 6,629,246 B1 * 9/2003 Gadi .................. H04L 63/0815
                                                                    726/28
7,523,276 B1 * 4/2009 Shankar ............. G06F 16/1787
                                                                    707/999.204

(Continued)

OTHER PUBLICATIONS

Search Report and Written Opinion of International Patent Application No. PCT/US2021/064780 dated Apr. 13, 2022, 9 pages.

(Continued)

*Primary Examiner* — Ghazal B Shehni
(74) *Attorney, Agent, or Firm* — Michael Guthrie; Jeffrey D. Frantz

(57) ABSTRACT

Methods, computing systems, and computer-readable media for synchronizing data across a first application suite and an isolated second application suite. The method includes generating a first identity for a user to access data from a first application suite; generating a notification that the first identity has been created, causing a second application suite to generate a second different user identity to access data from the second application suite; authenticating a user based on authentication information and the first user identity; receiving, from the first application suite, a first (Continued)

resource from the user; storing the received first resource on the first application suite; synchronizing the first resource from the first application suite to the second application suite; synchronizing a second resource, stored on the second application suite, from the second application suite to the first application suite; and providing the second resource to the user via the first application suite.

20 Claims, 7 Drawing Sheets

(56) References Cited

U.S. PATENT DOCUMENTS

| | | | |
|---|---|---|---|
| 2008/0104215 A1 | 5/2008 | Excoffier et al. | |
| 2014/0059642 A1* | 2/2014 | Deasy | H04W 12/00 726/1 |
| 2015/0120655 A1* | 4/2015 | Chi | H04L 67/1095 707/613 |
| 2017/0090795 A1* | 3/2017 | Varadharajan | G06F 3/067 |
| 2021/0141912 A1* | 5/2021 | Mowatt | G06F 21/62 |

OTHER PUBLICATIONS

Extended Search Report issued in European Patent Application No. 21912119.1 dated Oct. 28, 2024, 9 pages.
Chard, K. et al., "Efficient and Secure Transfer, Synchronization, and Sharing of Big Data", IEEE Cloud Computing, IEEE, 2024, 1(3), 10 pages.

* cited by examiner

SECURELY SHARING DATA ACROSS ISOLATED APPLICATION SUITES

CROSS-REFERENCE TO RELATED APPLICATIONS

The present application is a National Stage Entry of International Application Ser. No. PCT/US2021/064780, filed Dec. 22, 2021, which claims priority benefit of Patent Application No. 202031056153 in India, filed Dec. 23, 2020, the entirety of which is incorporated by reference herein and should be considered part of this specification.

BACKGROUND

Exploration and Production (E&P) software suites (e.g., petrotechnical suites) are used in the oilfield to collect and analyze a variety of technical data. This data may be used for a variety of petrotechnical applications and projects relating to, for example, locating, planning, drilling, and/or producing hydrocarbons from a well. Such E&P platforms may be collaborative, providing an environment in which teams of experts in different locations and/or different disciplines can work together to improve project success. In a petrotechnical suite architecture, the data which is being used or generated within a petrotechnical suite environment remains confined to petrotechnical suite boundaries (e.g., for security, data storage efficiency, etc.).

SUMMARY

Embodiments of the disclosure may provide a method including generating a first identity for a user to access data from a first application suite; generating a notification that the first identity has been created. Generating the notification causes a second application suite to generate a second user identity for the user to access data from the second application suite. The first identity and the second user identity are different, and the first application suite is isolated from the second application suite. The method includes receiving user authentication information from a client device; authenticating a user based on the authentication information and the first user identity; receiving, from the first application suite, a first resource from the user via the client device; storing the received first resource on the first application suite; synchronizing the first resource from the first application suite to the second application suite; synchronizing a second resource, stored on the second application suite, from the second application suite to the first application suite; and providing the second resource to the user via the first application suite.

Embodiments of the disclosure may also provide a computing system, including one or more processors; and a memory system comprising one or more non-transitory computer-readable media storing instructions that, when executed by at least one of the one or more processors, cause the computing system to perform operations. The operations may include generating a first identity for a user to access data from a first application suite; generating a notification that the first identity has been created. Generating the notification causes a second application suite to generate a second user identity for the user to access data from the second application suite. The first identity and the second user identity are different, and the first application suite is isolated from the second application suite. The operations further include receiving user authentication information from a client device; authenticating a user based on the authentication information and the first user identity; receiving, from the first application suite, a first resource from the user via the client device; storing the received first resource on the first application suite; synchronizing the first resource from the first application suite to the second application suite; synchronizing a second resource, stored on the second application suite, from the second application suite to the first application suite; and providing the second resource to the user via the first application suite.

Embodiments of the disclosure may further provide a non-transitory computer-readable medium storing instructions that, when executed by one or more processors of a computing system, cause the computing system to perform operations. The operations may include generating a first identity for a user to access data from a first application suite; generating a notification that the first identity has been created. Generating the notification causes a second application suite to generate a second user identity for the user to access data from the second application suite. The first identity and the second user identity are different, and the first application suite is isolated from the second application suite. The operations further include receiving user authentication information from a client device; authenticating a user based on the authentication information and the first user identity; receiving, from the first application suite, a first resource from the user via the client device; storing the received first resource on the first application suite; synchronizing the first resource from the first application suite to the second application suite; synchronizing a second resource, stored on the second application suite, from the second application suite to the first application suite; and providing the second resource to the user via the first application suite.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
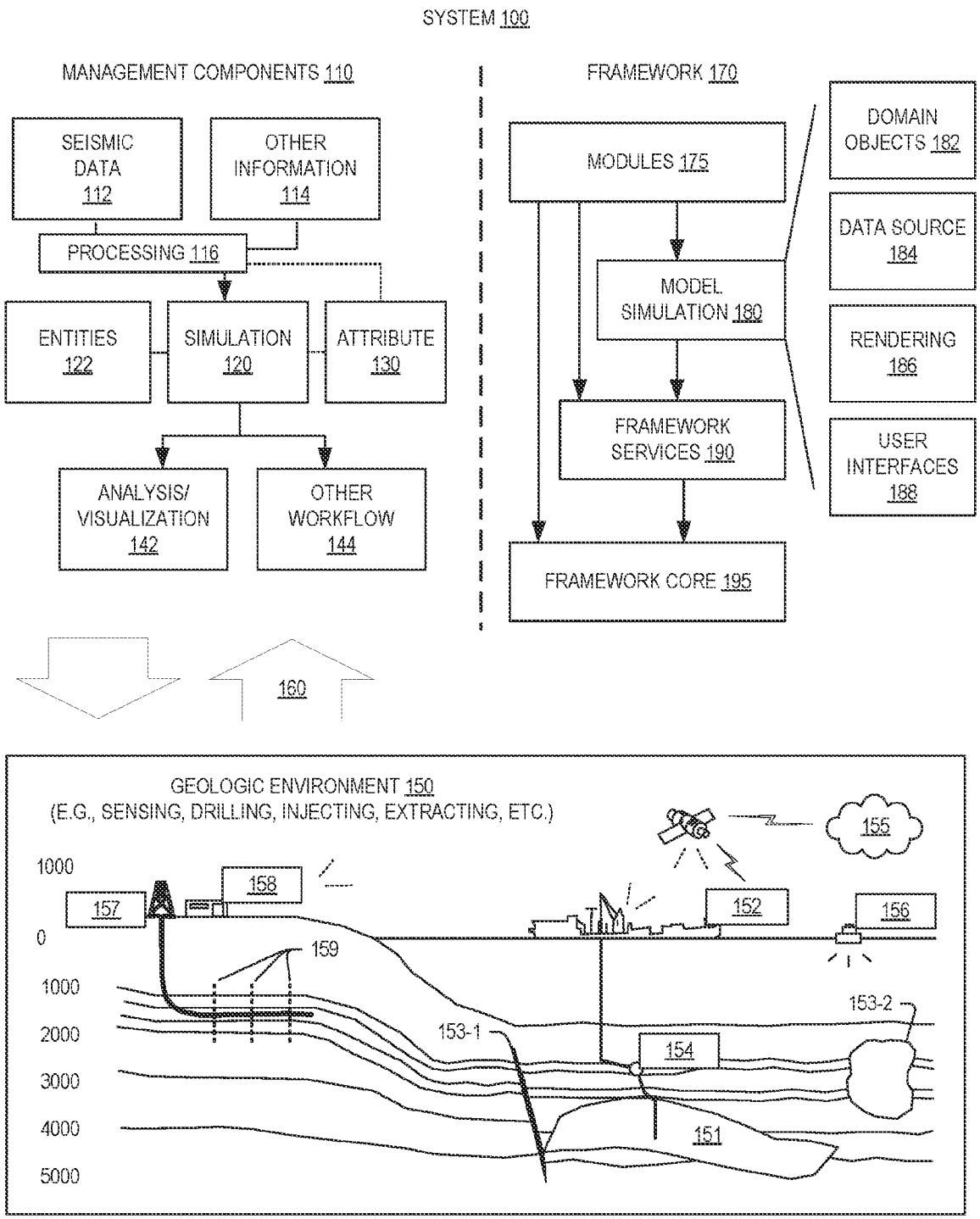
FIG. 1 illustrates an example of a system that includes various management components to manage various aspects of a geologic environment, according to an embodiment.

In a petrotechnical suite architecture (e.g., a system that hosts multiple petrotechnical applications), the data which is being used or generated within one petrotechnical suite environment remains confined to petrotechnical suite boundaries (e.g., for security, data storage efficiency, etc.). More specifically, data from one application suite is isolated and segregated from data from another application suite. As described herein an "isolated" application suite refers to a suite that is hosted on a separate system without direct communication with another application suite. While such an arrangement may increase security, isolating data between different application suites prevents users from using the data freely between the application suites. For example, in order for data from a first application suite to be securely transferred or used in a second application suite, a physical site visit may be required in which data is downloaded from the first application suite (e.g., to a mobile computing device, external storage device, etc.), and then uploaded to the second application suite. While it may be possible to establish direct connections between the two application suites, the security of the data may be compromised, as some users from the application suite may not be authorized to access data from the second application suite.

Accordingly, aspects of the present disclosure may include a system and/or method that uses a data partition or storage network to serve as an access point for data driven operations such that data may inter-operate between different application suites (e.g., petrotechnical application suites) in a secure manner in which data resources (e.g., data files) and data permissions are a synced, thereby preventing unauthorized users from accessing data from which they are not authorized. Further, access controls between different groups may be synced between two or more application suites to ensure that only authorized users in specific groups are permitted to view the data.

In some embodiments, an existing data partition that segregates two different application suites may be used as the access point to sync data between the two application suites. In some embodiments, the systems and/or methods, described herein, may translate and sync user identities in between two application deployment suites, translate and sync groups (e.g., active directory (AD) groups and/or other types of groups) from one application suite to equivalent groups in another application suite, and translate and sync memberships form one application suite with memberships in equivalent groups in another application suite. In some embodiments, the systems and/or methods, described herein, may sync the data partition from one application suite to an equivalent data partition in another application suite, and sync access credentials used to access the data partition from one application suite into equivalent groups for another application suite.

As described herein, an admin user may provide user inputs on an administrative client device to define various levels of segregation in the form of groups for a first application suite in order to manage workforce of the organization with proper authorization and authentication. Once a group is defined, an event message is emitted which is observed and received by an identity sync service running on an identity syncing component (which may be a tenant component for a second application suite). The identity syncing component may create a corresponding AD group in a tenant AD server associated with the second application suite.

In some embodiments, an admin user may define a new user (or remove an existing user) within a group associated with the first application suite. Once a new user is added or removed, an event is emitted which his observed and received by the identity sync service running on an identity syncing component. The identity syncing component may add or remove the user's AD identity may be added or removed from the corresponding AD group associated with the second application suite.

In some embodiments, the admin user may assign a data resource to a group associated with the first application suite. A user may then use credentials to access resources (e.g., files) that may be synced between the two application suites. Further, the user may upload a file to the first application suite to be synced to the second application suite. For example, the uploaded file may be synced to a data partition of the first application suite which is in turn synced to a tenant of the second application suit using a file sync service.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT' reservoir simulator (Schlumberger Limited, Houston, Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
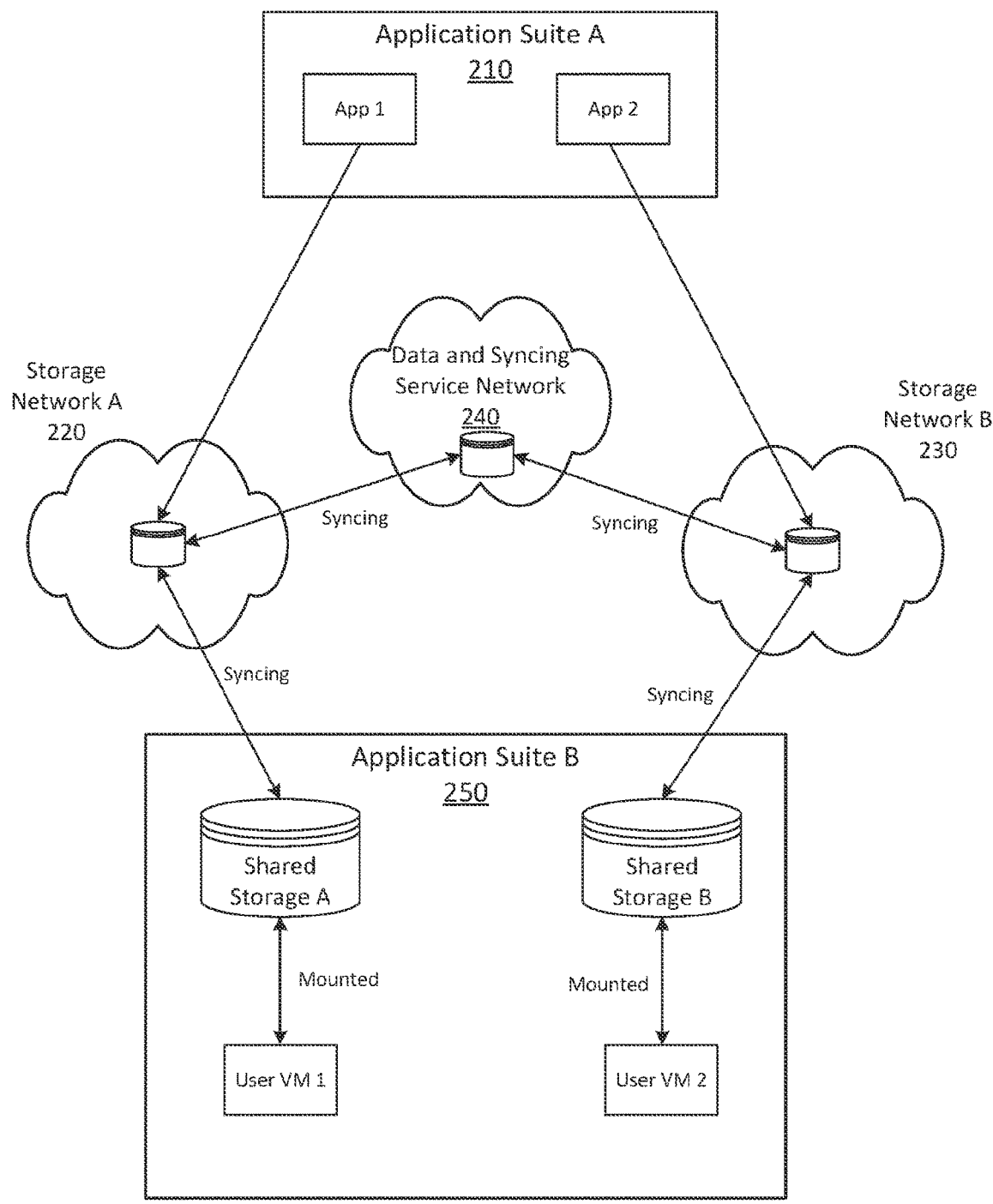
FIG. 2 illustrates an example network secure data sync architecture in accordance with aspects of the present disclosure.

FIG. 2 illustrates an example network secure data sync architecture in accordance with aspects of the present disclosure. As shown in FIG. 2, the network 200 may include a first application suite (e.g., an application suite A 210), a first storage network (e.g., a storage network A 220), a second storage network (e.g., a storage network B 230), a data syncing service network 240, and a second application suite (e.g., an application suite B 250). In some embodiments, the application suite A 210 and the application suite B 250 may be independent having isolated applications, storage devices, databases, different architectures, etc. For example, the application suite A 210 may have a first type of architecture in which the application suite A 210 hosts first and second applications (e.g., App 1 and App 2). The application suite B 250 may have a second type of architecture in which the application suite B 250 hosts first and second shared storages (e.g., shared storage A and shared storage B) which may be accessed via virtual machines mounted to the shared storages (e.g., User VM 1 and User VM 2). As further shown in FIG. 2, the storage network A 220, the storage network B 230, and the data syncing service network 240 may include one or more data storage devices. In some embodiments, the first application of the application suite A 210 may store data in the storage network A 220, and the second application of the application suite A 210 may store data in the storage network B 230. In some embodiments, the data syncing service network 240 may host a syncing service to synchronize data between the storage network A 220, the data syncing service network 240, and the first shared storage of the application suite B 250. As further shown in FIG. 2, the data syncing service network 240 may also synchronize data between the storage network B 230, the data syncing service network 240, and the second shared storage of the application suite B 250. In this way, data between the application suite A 210 and the application suite B 250 may be shared. As further described herein, permission data of various users and groups may be synced across the application suite A 210 and the application suite B 250 to prevent data from being access by unauthorized users.

Figure 3:
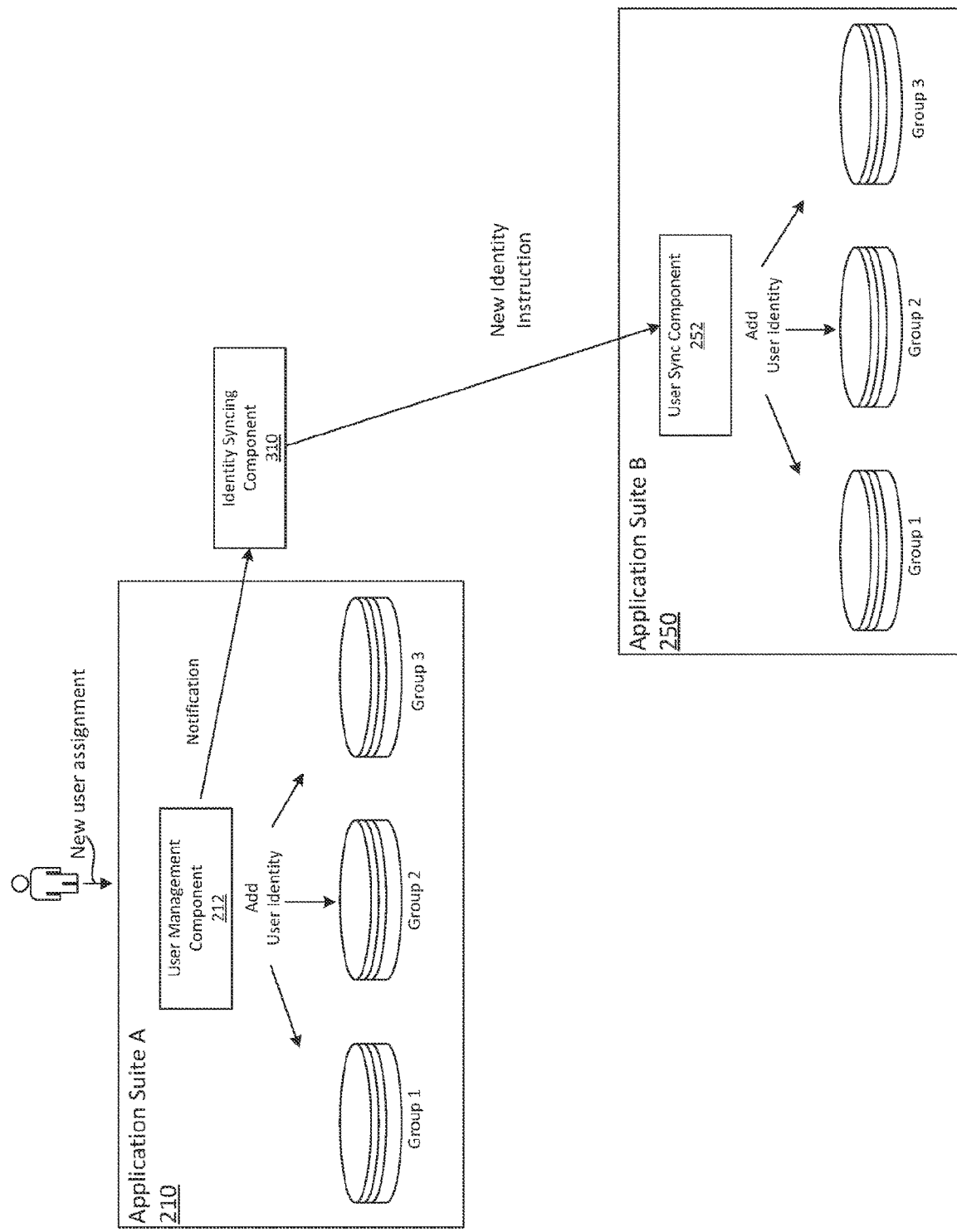
FIG. 3 illustrates an example implementation for syncing new user credentials across isolated application suites.

FIG. 3 illustrates an example implementation for syncing new user credentials across isolated application suites. More specifically, FIG. 3 illustrates syncing new user credentials across isolated application suites to permit the user to access data stored by the isolated applications suites (e.g., the application suite A 210 and the application suite B 250). In some embodiments, the new user may be assigned to one or more groups and the group assignments may also be synced. For example, the application suite A 210 may receive an instruction (e.g., via user input) to add or assign a new user to three groups associated with the application suite A 210. In some embodiments, a user management component 212 may receive the user input to assign a new user to the groups. Based on receiving the new user assignment instruction, the user management component 212 may add identity credentials for the new user. In some embodiments, the identity credentials may OAuth credentials, open ID credentials, a propriety format of authentication credentials, and/or other type of credentials in which a set of credentials (e.g., username, password, biometrics credentials, etc.) may be assigned to the user. In some embodiments, the identity credentials may be synchronized to the groups to which the user is assigned such that the user may access data linked to the groups.

As further shown in FIG. 3, the user management component 212 may output a notification to an identity syncing component 310 that a set of new user credentials have been created to permit the user to access the application suite A 210. In some embodiments, the identity syncing component 310 may be implemented in the data syncing service network 240. Based on receiving the notification, the identity syncing component 310 may output an instruction to the application suite B 250 to create a new identity and corresponding credentials for the user. More specifically, a user sync component 252 may receive the instruction from the identity syncing component 310 and execute the instruction to create a set of credentials (e.g., an SAuth identity) for the user. The set of credentials created by the user sync component 252 may be different than the credentials created by the user management component 212. In this way, the application suite A 210 and the application suite B 250 may maintain a different set of credentials to increase the level of security while still permitting the user to access data stored by the application suite A 210 and the application suite B 250. In some embodiments, the user sync component 252 may synchronize the credentials to the corresponding groups such that the user may access data linked to the groups.

Figure 4:
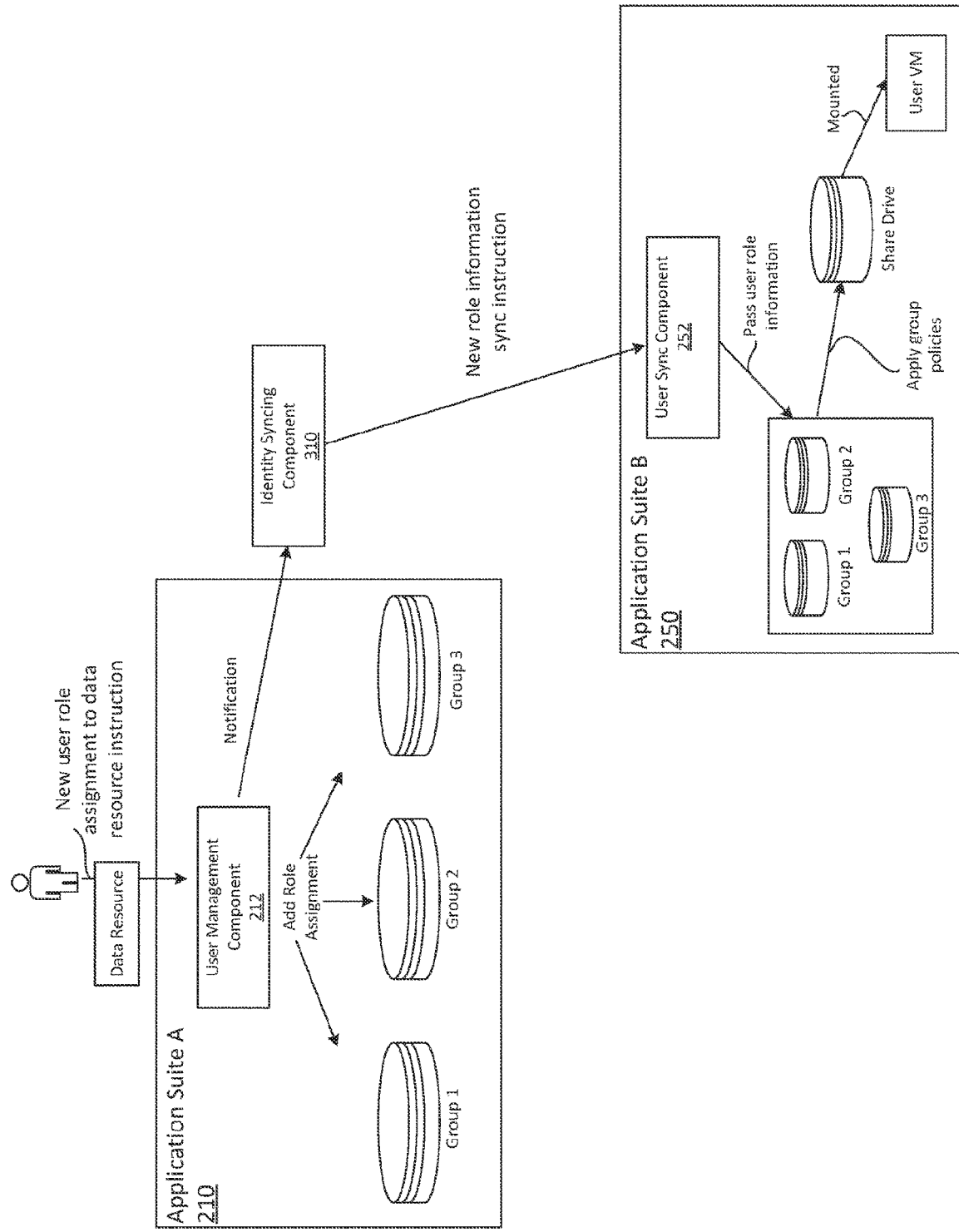
FIG. 4 illustrates an example implementation for syncing new user roles for a data resource across isolated application suites.

FIG. 4 illustrates an example implementation for syncing new user roles for a data resource across isolated application suites. As shown in FIG. 4, the user management component 212 may receive an instruction (e.g., via user input) to assign a new role to a user for a data resource (e.g., to permit the user to manage and/or modify the data resource, or serve as an administrator, manager, contributor, and/or other role for the data resource). Based on receiving the instruction, the user management component 212 may update user role information linked to the user's credentials previously generated. Further, the user management component 212 may synchronize the role assignment information across the groups to which the user is associated. In this way, the user's access to data may be updated based on their updated roles.

As further shown in FIG. 4, the user management component 212 may output a notification to the identity syncing component 310 that the user's role information has been updated. In some embodiments, the notification may identify the user and the user's updated role information. Based on receiving the notification, the identity syncing component 310 may generate and output an instruction to direct the application suite B 250 to synchronize the new role information. In some embodiments, the user sync component 252 may receive the instruction and pass the new user role information to the groups to which the user is assigned. Further, the group policies may be applied (e.g., to a share drive hosted by the application suite B 250) such that the group policies reflect the updated user role information, thereby permitting the user to perform functions associated with the updated role (e.g., via a virtual machine to which the share drive is mounted).

Figure 5:
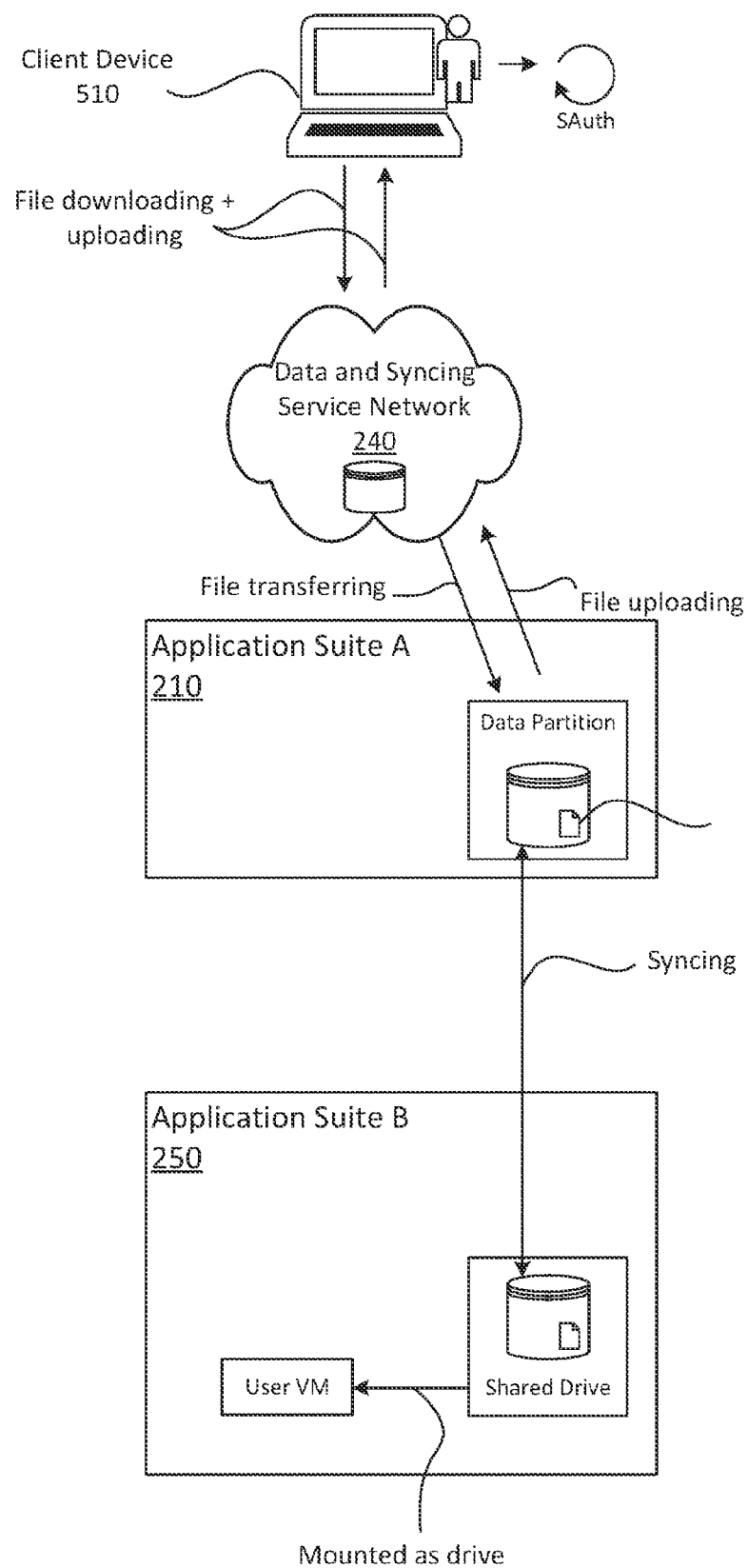
FIG. 5 illustrates an example implementation for synchronizing resources between isolated application suites and providing secure access to the resources.

FIG. 5 illustrates an example implementation for synchronizing files and resources between isolated application suites and providing secure access to the files. As shown in FIG. 5, a user may use a client device to upload files from and/or download files to an application suite A 210 (e.g., stored in a data partition hosted by the application suite A 210). For example, the user may input credentials (e.g., into an application or web portal hosted by the data syncing service network 240) to authenticate the user. Based on the credentials, the user may access the application suite A 210 (e.g., to upload a file to the application suite A 210 via the data syncing service network 240). In some embodiments, the uploaded file may be tagged with user permission information based on the user's identity (e.g., linked to the credentials). In some embodiments, the permission information may identify users permitted to access the uploaded file based on user group information and/or user role information linked to the user's identity. In some embodiments, the data syncing service network 240 may provide the file to the data partition of the application suite A 210 and sync the file between the application suite A 210 and the application suite B 250. More specifically, the data syncing service network 240 may synchronize the file from the data partition in the application suite A 210 to a shared drive in the application suite B 250. In this way, the file or resource may be accessible by an authorized user through a virtual machine to which the shared drive in the application suite B 250 is mounted.

As further shown in FIG. 5, the data syncing service network 240 may initiate syncing of files between the shared drive in the application suite B 250 to the data partition in the application suite A 210. More specifically, the data syncing service network 240 may sync a file originally stored on the application suite B 250 to the application suite A 210 (e.g., in which the file originally stored on the application suite B 250 may be tagged with permissions information based on an identity of a user who uploaded the file. In this way, users may download files from the application suite B 250 via the application suite A 210. As described herein, the user may be permitted to download files to which the user has access. For example, files stored in the shared drive of the application suite B 250 and/or the application suite A 210 may be tagged with group identifiers, and the user may view those files associated with the groups to which the user is associated. In this way, the user may securely access files stored by either the application suite A 210 or the application suite B 250 when the application suite A 210 and application suite B 250 are isolated and operate on different architectures.

Figure 6:
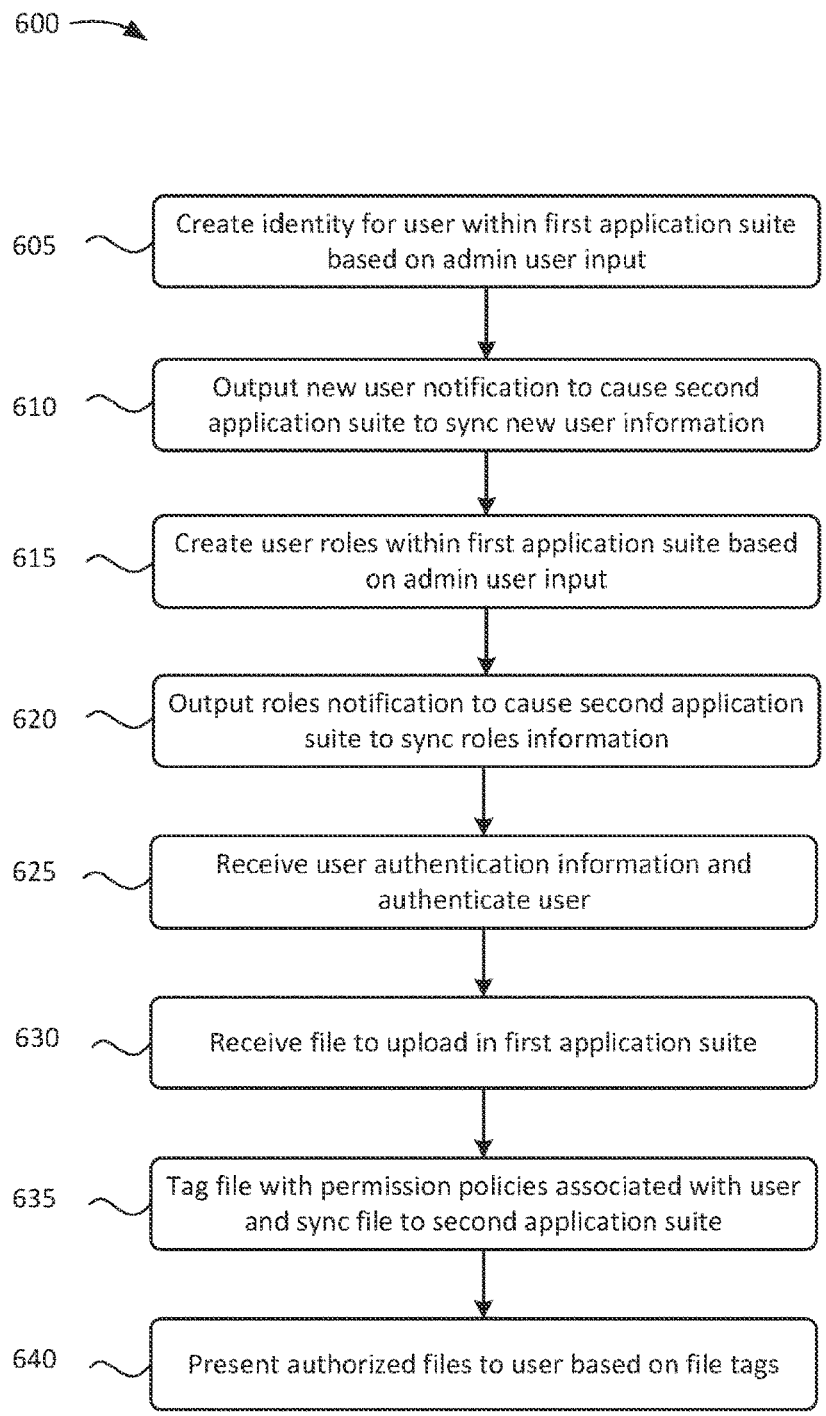
FIG. 6 illustrates an example flowchart of a process for synchronizing data across isolated application suites and providing secure access to the data.

FIG. 6 illustrates an example flowchart of a process for synchronizing data across isolated application suites and providing secure access to the data. The blocks of FIG. 6 may be implemented in the environment of FIG. 1, for example, and are described using reference numbers of elements depicted in FIG. 1. As noted herein, the flowchart illustrates the architecture, functionality, and operation of possible implementations of systems, methods, and computer program products according to various embodiments of the present disclosure.

As shown in FIG. 6, the process 600 may include creating an identity for a user within a first application suite based on admin user input (as at block 605). For example, the user management component 212 may create an identity for the user within the application suite A 210 based on user input (e.g., from an admin user or the user themselves). Referring to FIG. 3 as an illustrative example, the user management component 212 may create the set of SAuth credentials based on admin user input instructing the user management component 212 to create the user identity. In some embodiments, the user identity may be added to user groups to which the user has been assigned.

The process 600 also may include outputting a new user notification to cause a second application suite to sync new user information (as at block 610). For example, the user management component 212 may output a notification to cause the application suite B 250 to sync the user information for the user identify created at block 605. Referring to FIG. 3 as an illustrative example, the user management component 212 may output the notification to the identity syncing component 310, which may generate a new identity instruction identifying the user and groups to which the user is assigned. More specifically, the user sync component 252 may receive the instruction from the identity syncing component 310 and execute the instruction to create a set of credentials (e.g., an OAuth open identity, etc.) for the user. The set of credentials created by the user sync component 252 may be different than the credentials created by the user management component 212. In some embodiments, the user sync component 252 may synchronize the credentials to the corresponding groups such that the user may access data linked to the groups. In some embodiments, the system may sync or link identities for a specific user that were independently created on the first and second suites by identifying a common attribute associated with the identities (e.g., an e-mail address or other attribute that is common to both identities).

The process 600 further may include creating user roles within the first application suite based on admin user input (as at block 615). For example, the user management component 212 may create (or update) user roles based on user input from an administrator. Referring to FIG. 4 as an illustrative example, the user management component 212 may assign a new role to a user for a data resource (e.g., to permit the user to manage and/or modify the data resource, or serve as an administrator, manager, contributor, and/or other role for the data resource). Based on receiving the user input from the administrator, the user management component 212 may update user role information linked to the user's credentials previously generated. Further, the user management component 212 may synchronize the role assignment information across the groups to which the user is associated.

The process 600 also may include outputting a roles notification to cause the second application suite to sync the new roles information (as at block 620). For example, the user management component 212 may output a notification identifying the new or updated roles for the user. Referring to FIG. 4 as an illustrative example, the user management component 212 may output a notification to the identity syncing component 310 that the user's role information has been updated. In some embodiments, the notification may identify the user and the user's updated role information. Based on receiving the notification, the identity syncing component 310 may generate and output an instruction to direct the application suite B 250 to synchronize the new role information. In some embodiments, the user sync component 252 may receive the instruction and pass the new user role information to the groups to which the user is assigned.

The process 600 further may include receiving user authentication information and authenticating the user (as at block 625). For example, the data syncing service network 240 may receive authentication information (e.g., SAuth information via a web portal or application from a client device 510) and validate the authentication information to authenticate the user to access data/files from the application suite A 210 (e.g., as shown in FIG. 5).

The process 600 also may include receiving a file to upload in the first application suite (as at block 630). For example, the data syncing service network 240 may receive a file or resource to upload from the client device 510 (e.g., based on user input and as shown in FIG. 5).

The process 600 further may include tagging the file with permission policies associated with the user and sync the file to a second application suite (as at block 635). For example, the data syncing service network 240 may tag the file with information identifying policies indicating groups authorized to view or access the file (e.g., based on the policies associated with the user that uploaded the file). In this way, the file may not be accessed by unauthorized users when the file is synced to the second application suite (e.g., the application suite B 250). Once the file is tagged, the data syncing service network 240 may sync the file to the application suite B 250 (e.g., as shown in FIG. 5).

The process 600 also may include presenting authorized files to the user based on file tags (as at block 640). For example, the data syncing service network 240 may present files to the user to which that user is authorized to access based on tags, access control lists, etc.) associated with the files. In some embodiments, these files may include files that may have originated from the application suite B 250 and were later synced to the application suite A 210. In this way, the user may download/view files via the application suite A 210 including files and data that originated from the application suite B 250 isolated from the application suite A 210.

Accordingly, the process 600 synchronizes files/data as well as the user's credentials to authorize accessing of the files between isolated application suites (e.g., the application suite A 210 and the application suite B 250). In this way, the need for on-premises file transfers between the application suites using external devices (e.g., laptops, removable media, etc.) is eliminated without compromising the security of the data and preventing unauthorized users from remotely accessing the data.

Figure 7:
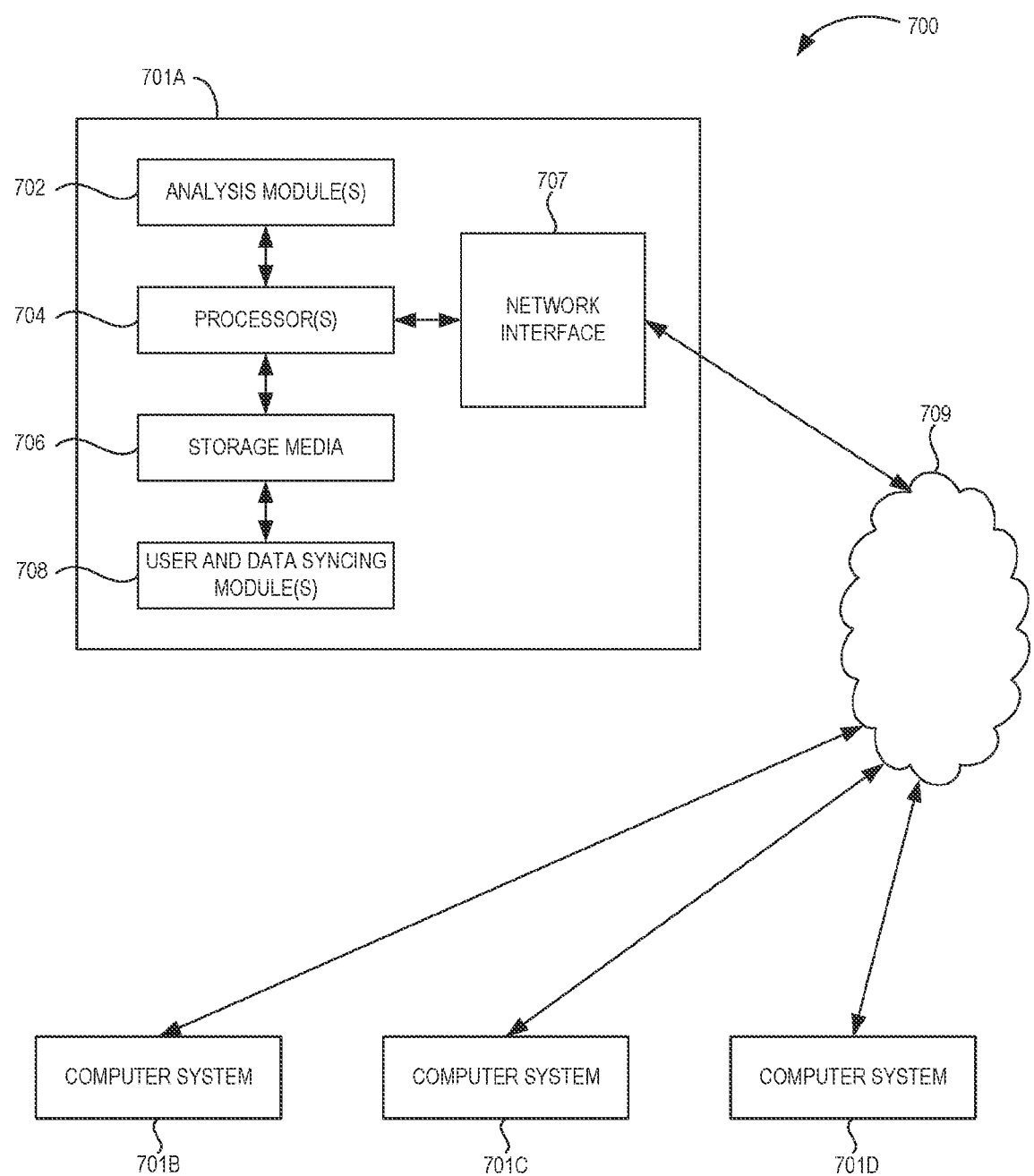
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 602 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more user and data syncing module(s) 708. In the example of computing system 700, computer system 701A includes the user and data syncing module 708. In some embodiments, a single user and data syncing module may be used to perform some aspects of one or more embodiments of the methods disclosed herein. In other embodiments, a plurality of user and data syncing modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, the term "first" and "second" may be used interchangeably. That is, an action described as being performed by a "first" device may be performed by a "second" device, and vice versa. Further, the terms "file" and "resource" may be used interchangeably.

What is claimed is:

1. A method, comprising:
generating a first identity for a user to access data from a first application suite;
generating a notification that the first identity has been created, the generating the notification causing a second application suite to generate a second user identity for the user to access data from the second application suite, the first identity and the second user identity being different, the first application suite being isolated from the second application suite by being hosted on a separate system without direct communication between the application suites;
receiving user authentication information from a client device;
authenticating a user based on the authentication information and the first user identity;
receiving, from the first application suite, a first resource from the user via the client device;
storing the received first resource on the first application suite;
synchronizing the first resource from the first application suite to the second application suite;
synchronizing a second resource, stored on the second application suite, from the second application suite to the first application suite; and
providing the second resource to the user via the first application suite.

2. The method of claim 1, wherein the first application suite and the second application suite have different architectures and host different applications.

3. The method of claim 1, further comprising tagging the first resource with user permission information based on the first user identity, the permission information identifying users permitted to access the first resource based on user group information or user role information.

4. The method of claim 1, further comprising:
determining that the user is permitted to access the second resource based on the second user identity and permission information tagged in the second resource,
wherein the providing the second resource based on determining that the user is permitted to access the second resource.

5. The method of claim 1, further comprising presenting a list of resources to which the user is permitted to access based on permissions information included in the list of resources.

6. The method of claim 1, further comprising linking the first identity and the second identity to the user based on identifying a common attribute within the first identity and the second identity.

7. The method of claim 1, further comprising generating and syncing user roles information across the first application suite and the second application suite.

8. A computing system, comprising:
one or more processors; and
a memory system comprising one or more non-transitory computer-readable media storing instructions that, when executed by at least one of the one or more processors, cause the computing system to perform operations, the operations comprising:
generating a first identity for a user to access data from a first application suite;
generating a notification that the first identity has been created, the generating the notification causing a second application suite to generate a second user identity for the user to access data from the second application suite, the first identity and the second user identity being different, the first application suite being isolated from the second application suite by being hosted on a separate system without direct communication between the application suites;
receiving user authentication information from a client device;
authenticating a user based on the authentication information and the first user identity;
receiving, from the first application suite, a first resource from the user via the client device;
storing the received first resource on the first application suite;
synchronizing the first resource from the first application suite to the second application suite;
synchronizing a second resource, stored on the second application suite, from the second application suite to the first application suite; and
providing the second resource to the user via the first application suite.

9. The computing system of claim 8, wherein the first application suite and the second application suite have different architectures and host different applications.

10. The computing system of claim 8, wherein the operations further comprise tagging the first resource with user permission information based on the first user identity, the permission information identifying users permitted to access the first resource based on user group information or user role information.

11. The computing system of claim 8, wherein:
the operations further comprise determining that the user is permitted to access the second resource based on the second user identity and permission information tagged in the second resource; and
the providing the second resource based on determining that the user is permitted to access the second resource.

12. The computing system of claim 8, wherein the operations further comprise presenting a list of resources to which the user is permitted to access based on permissions information included in the list of resources.

13. The computing system of claim 8, wherein the operations further comprise linking the first identity and the second identity to the user based on identifying a common attribute within the first identity and the second identity.

14. The computing system of claim 8, wherein the operations further comprise generating and syncing roles information across the first application suite and the second application suite.

15. A non-transitory computer-readable medium storing instructions that, when executed by one or more processors of a computing system, cause the computing system to perform operations, the operations comprising:
generating a first identity for a user to access data from a first application suite;
generating a notification that the first identity has been created, the generating the notification causing a second application suite to generate a second user identity for the user to access data from the second application suite, the first identity and the second user identity being different, the first application suite being isolated from the second application suite by being hosted on a separate system without direct communication between the application suites;
receiving user authentication information from a client device;
authenticating a user based on the authentication information and the first user identity;
receiving, from the first application suite, a first resource from the user via the client device;
storing the received first resource on the first application suite;
synchronizing the first resource from the first application suite to the second application suite;
synchronizing a second resource, stored on the second application suite, from the second application suite to the first application suite; and
providing the second resource to the user via the first application suite.

16. The non-transitory computer-readable medium of claim 15, wherein the first application suite and the second application suite have different architectures and host different applications.

17. The non-transitory computer-readable medium of claim 15, wherein the operations further comprise tagging the first resource with user permission information based on the first user identity, the permission information identifying users permitted to access the first resource based on user group information or user role information.

18. The non-transitory computer-readable medium of claim 15, wherein:
the operations further comprise determining that the user is permitted to access the second resource based on the second user identity and permission information tagged in the second resource; and
the providing the second resource based on determining that the user is permitted to access the second resource.

19. The non-transitory computer-readable medium of claim 15, wherein the operations further comprise presenting a list of resources to which the user is permitted to access based on permissions information included in the list of resources.

20. The non-transitory computer-readable medium of claim 15, wherein the operations further comprise linking the first identity and the second identity to the user based on identifying a common attribute within the first identity and the second identity.

* * * * *